United States Patent
Lefort

[15] 3,689,519
[45] Sept. 5, 1972

[54] PREPARATION OF CHLOROSILANES FROM DISILOXANES

[72] Inventor: Marcel Lefort, Caluire, France

[73] Assignee: Rhone-Poulene S.S., Paris 8e, France

[22] Filed: Aug. 20, 1971

[21] Appl. No.: 173,703

[30] Foreign Application Priority Data

Aug. 21, 1970 France..................7030754

[52] U.S. Cl. .........................................260/448.2 E
[51] Int. Cl. ..............................................C07f 7/12
[58] Field of Search .............................260/448.2 E

[56] References Cited

UNITED STATES PATENTS 3,294,725  12/1966  Findlay et al....260/448.2 E X
3,398,117  8/1968   Baronnier et al....260/448.2 E X
3,409,588  11/1968  Lefort et al......260/448.2 E X

OTHER PUBLICATIONS

Noll, "Chemistry and Technology of Silicones," 2nd Ed., Academic Press, N.Y. (1968), pps. 233–234.

Primary Examiner—Delbert E. Gantz
Assistant Examiner—P. F. Shaver

[57] ABSTRACT

Chlorosilanes are obtained by reacting disiloxanes of formula:

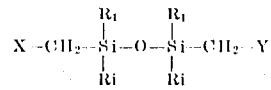

wherein $R_1$ is hydrogen or an aliphatic or cycloaliphatic radical and X and Y are hydrogen, chlorine or

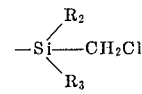

wherein $R_2$ and $R_3$ are hydrogen, chlorine or an aliphatic, cycloaliphatic, phenyl, phenylalkyl, alkylphenyl, alkoxy or cycloalkoxy radical; with thionyl chloride in the presence of sulphuric, orthophosphoric or pyrophosphoric acid.

6 Claims, No Drawings

PREPARATION OF CHLOROSILANES FROM DISILOXANES

The present invention relates to a process for preparing chlorosilanes by reaction of thionyl chloride with a disiloxane in the presence of a strong inorganic acid.

It is known that in general, reaction of thionyl chloride with a disiloxane allows two chlorosilanes to be obtained through breakage of the siloxane bond, but the presence of a catalyst is always necessary in practice to trigger the reaction. Various catalyst systems have been recommended. U.S. Pat. No. 2,500,761, describes the use of small amounts of hydrogen halide acids or metal halides. Acetic acid has also been used to catalyse the cleavage of the siloxane bond (J. Prakt. Chem. 23, 206 1964). However, these catalyst do not always make it possible to cleave the siloxane bond of all disiloxanes to give a chlorosilane.

The present invention provides a process for the preparation of a chlorosilane wherein thionyl chloride is reacted, in the presence of sulphuric acid, orthophosphoric acid or pyrophosphoric acid with a disiloxane of the general formula:

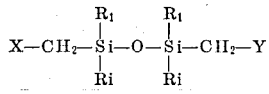

wherein the symbols $R_1$, which may be identical or different, each represent a hydrogen atom, or a straight or branched, saturated or unsaturated, aliphatic hydrocarbon radical having up to six carbon atoms, or a saturated or unsaturated cycloaliphatic hydrocarbon radical having five or six carbon atoms in the ring; the symbols X and Y, which may be identical or different, each represent a hydrogen atom, a chlorine atom or a silyl radical of formula:

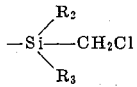

in which the symbols $R_2$ and $R_3$, which may be identical or different, each represent a chlorine atom, a hydrogen atom, a straight or branched, saturated or unsaturated, aliphatic hydrocarbon radical having up to six carbon atoms, a saturated or unsaturated cycloaliphatic hydrocarbon radical having five or six carbon atoms in the ring, a phenyl, or a phenylalkyl or alkylphenyl radical having up to six carbon atoms in the alkyl residue, an alkoxy radical having up to six carbon atoms, or a cycloalkoxy radical having five or six carbon atoms in the ring.

In the reaction, cleavage occurs at the Si—O—Si bonds and, where appropriate, also at the Si—O—C bonds, in accordance with the following equations:

Thus, depending on the chosen starting product, either a single chlorosilane, or two different chlorosilanes, or a chlorosilane and a chlorinated hydrocarbon, will be produced.

Si—O—C bonds will be broken if the symbols $R_2$ and $R_3$ represent alkoxy or cycloalkoxy radicals.

Disiloxanes which may be used in the process include, tetrahydrogeno-1,3-dimethyldisiloxane, hexamethyldisiloxane, 1-3-di-(chloromethyl)-tetramethyl-disiloxane, 1,3-di-(chloromethyl)-1,3-dimethyl-1,3-divinyl-disiloxane, chloromethylpentamethyldisiloxane, 2,2,4,4,6,6-hexamethyl-7-chloro-2,4,6-trisila-3-oxa-heptane, 2,2,4,4,6-pentamethyl-6-butoxy-7-chloro-3-oxa-2,4,6-trisila-heptane, 4,4,6,6-tetramethyl-1-chloro-2,2-dibutoxy-5-oxa-2,4,6-trisila-heptane, 4,4,6,6-tetramethyl-1,2,2-trichloro-5-oxa-2,4,6-trisila-heptane, 2,2,4,4,6,6,8,8-octamethyl-1,9-dichloro-5-oxa-2,4,6,8-tetrasila-nonane, 2,4,4,6,6,8-hexamethyl-1,2,8,9-tetrachloro-5-oxa-2,4,6,8-tetrasila-nonane and 4,4,6,6-tetramethyl-1,9-dichloro-2,2,8,8-tetrabutoxy-5-oxa-2,4,6,8-tetrasila-nonane.

The quantity of the strong inorganic acid used as catalyst can vary to a great extent but an amount which is from 0.1 to 5 percent of the total weight of the reagents is usually most suitable.

The process of the invention may be carried out by heating the reagents usually to a temperature of 70° to 150° C. The respective proportions of the various reagents are not critical but in general an amount of thionyl chloride is used which is one to two times the theoretically required amount, (the theoretical amount being one molecule of thionyl chloride per atom of oxygen bonded to at least one silicon atom). The process can be carried out in the presence of a solvent and any hydrocarbon of aliphatic, cycloaliphatic or aromatic nature can be used for this purpose.

During the reaction, sulphur dioxide is evolved and is removed from the reaction medium at the rate at which it is formed. When the reaction has ended, the chlorosilanes produced can be recovered by any known means, for example by distillation.

The process according to the invention constitutes one stage in the purification of monochlorosilanes. It is sometimes very difficult to obtain monochlorosilanes in the pure state from mixtures of other chlorosilanes by usual means, such as distillation. The conversion of a monochlorosilane into its disiloxane derivative, the isolation of this disiloxane in the pure state and the conversion of this disiloxane back to a chlorosilane serve in accordance with this invention to regenerate the initial chlorosilane and make it possible to obtain pure products. Furthermore, chlorosilanes with chloromethyl groups are valuable synthetic reagents which are used industrially to obtain silacycloalkanes.

The Examples which follow illustrate the invention.

EXAMPLE 1

231 g of tetramethyl-1,3-dichloromethyl-disiloxane and 143 g of thionyl chloride are heated in a reaction flask, under reflux at 100°–110° C and 10 cm³ of sulphuric acid are run in dropwise over the entire duration of the operation. The evolution of sulphur dioxide gas ends after 19 hours 20 minutes. Distillation yields 115 g of dimethylchloromethylchlorosilane, of boiling point $_{758}$ 113° C as well as 76 g of unconverted tetramethyldichloromethylsiloxane.

EXAMPLE 2

The procedure described in Example 1 is repeated, replacing the 10 cm³ of sulphuric acid with 20 cm³ of phosphoric acid. The evolution of sulphur dioxide gas ends after 21 hours 30 minutes of heating. Distillation yields 106 g of dimethylchloromethylchlorosilane of boiling point $_{758}$ 113° C.

By way of comparison, the procedure described above was repeated replacing the phosphoric acid by various other catalysts previously used for breaking disiloxanes:

When 2 g of anhydrous zinc chloride was used only 2 g of dimethylchloromethylchlorosilane was obtained.

When 2 g of anhydrous aluminum chloride or 10 ml of acetic acid were used, the reaction did not even start (there was no evolution of sulphur dioxide).

When hydrochloric acid was bubbled in at the rate of 4.5 l/hour, the tetramethyldichloromethylsiloxane did not react at all and was recovered by distillation at the end of the experiment.

EXAMPLE 3

8761 g of 2,2,4,4,6,6-hexamethyl-7-chloro-2,4,6-trisila-3-oxa-heptane and 5831 g of thionyl chloride are heated in a reaction flask under reflux at 94°–98° C, and 18 cm³ of concentrated sulphuric acid are run in over the entire duration of the operation. The evolution of sulphur dioxide gas ceases after 15 hours' heating, while 3040 g of trimethylchlorosilane distill and are collected in traps. The contents remaining in the flask are thereafter rectified under reduced pressure, and 6530 g of 2,4,4-trimethyl-2,5-dichloro-2,4-disila-pentane is obtained, b.p.$_{17}$ 94°–98° C.

EXAMPLE 4

511 g of 2,2,4,4,6-pentamethyl-6-butoxy-7-chloro-3-oxa-2,4,6-trisila-heptane and 775 g of thionyl chloride are heated in a reaction flask under reflux at 100°–110° C, and 30 cm³ of sulphuric acid are run in over the entire duration of the operation. After 23 hours 50 minutes' heating, evolution of sulphur dioxide ceases and 382 g of a mixture of trimethylchlorosilane, butyl chloride and excess thionyl chloride have been distilled during the operation. The contents remaining in the flask are then rectified under reduced pressure and 287 g of 2,4-dimethyl-2,4,5-trichloro-2,4-disila-pentane is obtained, b.p.$_{0.1}$ 40°–40.5° C.

EXAMPLE 5

789 g of 4,4,6,6-tetramethyl-1-chloro-2,2-dibutoxy-5-oxa-2,4,6-trisila-heptane and 1071 g of thionyl chloride are heated in a reaction flask under reflux at 85°–95 C, and 20 cm³ of sulphuric acid are run in over the entire duration of the operation. Evolution of sulphur dioxide ceases after 18 hours' heating. During this period, 242 g of a mixture of trimethylchlorosilane, butyl chloride and excess thionyl chloride distilled. The contents remaining in the reaction flask are then rectified under reduced pressure and pure 2-methyl-2,4,4,5-tetrachloro-2,4-disila-pentane is obtained, b.p.$_{12}$ 94.4°–96.4° C.

I claim:

1. A process for the preparation of chlorosilane wherein thionyl chloride is reacted, in the presence of sulphuric acid, orthophosphoric acid or pyrophosphoric acid with a disiloxane of the general formula:

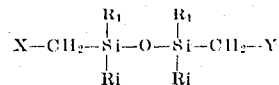

wherein the symbols $R_1$, which may be identical or different, each represent a hydrogen atom, or a straight or branched, saturated or unsaturated, aliphatic hydrocarbon radical having up to six carbon atoms, or a saturated or unsaturated cycloaliphatic hydrocarbon radical having five or six carbon atoms in the ring; the symbols X and Y, which may be identical or different, each represent a hydrogen atom, a chlorine atom or a silyl radical of formula:

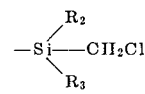

in which the symbols $R_2$ and $R_3$, which may be identical or different, each represent a chlorine atom, a hydrogen atom, a straight or branched, saturated or unsaturated, aliphatic hydrocarbon radical having up to six carbon atoms, a saturated or unsaturated cycloaliphatic hydrocarbon radical having five or six carbon atoms in the ring, a phenyl, or a phenylalkyl or alkylphenyl radical having up to six carbon atoms in the alkyl residue, an alkoxy radical having up to six carbon atoms, or a cycloalkoxy radical having five or six carbon atoms in the ring.

2. A process according to claim 1, wherein the quantity of sulphuric, orthophosphoric or pyrophospheric acid used is 0.1–5 percent by weight based on the total weight of the reagents.

3. A process according to claim 1, wherein the reaction is carried out at a temperature of 70°–150° C.

4. A process according to claim 1, wherein the amount of thionyl chloride used is 1–2 moles per gram atom of oxygen in the disiloxane bonded to silicon.

5. A process according to claim 1, wherein the reaction is carried out in the presence of a hydrocarbon solvent.

6. A process according to claim 1, wherein the disiloxane and thionyl chloride are heated under reflux and the sulphuric, orthophosphoric or pyrophosphoric acid is run in to refluxing mixture dropwise until evolution of sulphur dioxide ceases.

* * * * *